(12) United States Patent
Vlachos et al.

(10) Patent No.: US 10,311,540 B2
(45) Date of Patent: Jun. 4, 2019

(54) RADIAL DENSITY MASKING SYSTEMS AND METHODS

(71) Applicant: VALVE CORPORATION, Bellevue, WA (US)

(72) Inventors: Alex Vlachos, Bellevue, WA (US); Kenneth Barnett, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 15/420,868

(22) Filed: Jan. 31, 2017

(65) Prior Publication Data

US 2017/0221184 A1   Aug. 3, 2017

Related U.S. Application Data

(60) Provisional application No. 62/290,775, filed on Feb. 3, 2016.

(51) Int. Cl.
   *G06T 1/20*   (2006.01)

(52) U.S. Cl.
   CPC ........................ *G06T 1/20* (2013.01)

(58) Field of Classification Search
   CPC ........................................ G06T 1/20
   See application file for complete search history.

(56) References Cited

U.S. PATENT DOCUMENTS

| | | | | |
|---|---|---|---|---|
| 8,670,630 B1* | 3/2014 | Kwatra | ................ | G06T 7/0075 358/1.2 |
| 2004/0001067 A1* | 1/2004 | Toksvig | ................ | G06T 5/20 345/531 |
| 2006/0066612 A1* | 3/2006 | Yang | ................ | G06T 15/205 345/419 |
| 2009/0080796 A1* | 3/2009 | Capata | ................ | G06T 7/0002 382/275 |
| 2009/0141980 A1* | 6/2009 | Elliott | ................ | G09G 3/001 382/190 |
| 2014/0247277 A1* | 9/2014 | Guenter | ................ | G06T 11/00 345/611 |

* cited by examiner

Primary Examiner — William A Beutel
(74) Attorney, Agent, or Firm — Lee & Hayes, P.C.

(57) ABSTRACT

Systems and methods for implementing radial density masking graphics rendering for use in applications such as head mounted displays ("HMDs") are described. Exemplary algorithms are disclosed, according to which image resolution varies within an image depending on the distance of a particular point on the image from one or more fixation points. Reconstruction algorithms according to certain embodiments include three stages: (1) hole filling; (2) cross-cell blending; and (3) Gaussian blur.

18 Claims, 20 Drawing Sheets

1100

900

1000

1400

| 1/16 | 1/8 | 1/16 |
|------|-----|------|
| 1/8  | 1/4 | 1/8  |
| 1/16 | 1/8 | 1/16 |

FIG. 14

RADIAL DENSITY MASKING SYSTEMS AND METHODS

CROSS-REFERENCE TO RELATED APPLICATION

This application claims the benefit of Provisional Application Ser. No. 62/290,775, filed on Feb. 3, 2016, the contents of which are herein incorporated by reference in their entirety for all purposes.

BACKGROUND OF THE DISCLOSURE

1. Field of the Disclosure

The disclosure relates generally to computer graphics processing. Certain aspects of the present disclosure relate more specifically to radial density masking graphics rendering techniques using subviews or checkered pixel quads for use in applications such as in head mounted displays ("HMDs").

2. General Background

In the technical fields of image processing and computer graphics, "foveated rendering" refers to a technique in which image resolution, or amount of detail, varies within an image depending on the distance of a particular point on the image from one or more fixation points. Typically, in foveated rendering implementations, a fixation point is associated with the highest resolution region of the image, and may correspond to the center of the human eye's retina, commonly known as the fovea. The image is rendered with higher resolution at or near the fixation point because the sensitivity of the human eye is reduced as the angular distance from the fovea of the eye is increased. For example, contrast sensitivity is known to decrease as one moves from the center of the retina to the periphery.

When a viewer's approximate point of gaze is known, image rendering systems may take advantage of this physiological phenomenon by intentionally reducing the amount of information contained in a rendered image (i.e., in the resolution of the image) as the distance from the point of gaze increases. Depending on the details of each particular implementation, such techniques may decrease the amount of image data that must be transmitted, increase image rendering speed, or both. Some known implementations include eye trackers that measure the viewer's eye position and movement to determine fixation points, and these are sometimes called "gaze contingent displays." In certain implementations, such as in HMDs, a viewer's gaze is typically fixed on or near the center of the display associated with each of the viewer's eye.

It is desirable to address the current limitations in this art. As described further herein, aspects of the present invention relate to radial density masking graphics rendering techniques using subviews or checkered pixel quads for use in applications such as HMDs.

BRIEF DESCRIPTION OF THE DRAWINGS

By way of example, reference will now be made to the accompanying drawings, which are not to scale.

FIG. 14 is an exemplary diagram of a 3×3 Gausian blur kernel according to certain embodiments of the present invention.

DETAILED DESCRIPTION

Figure 1:
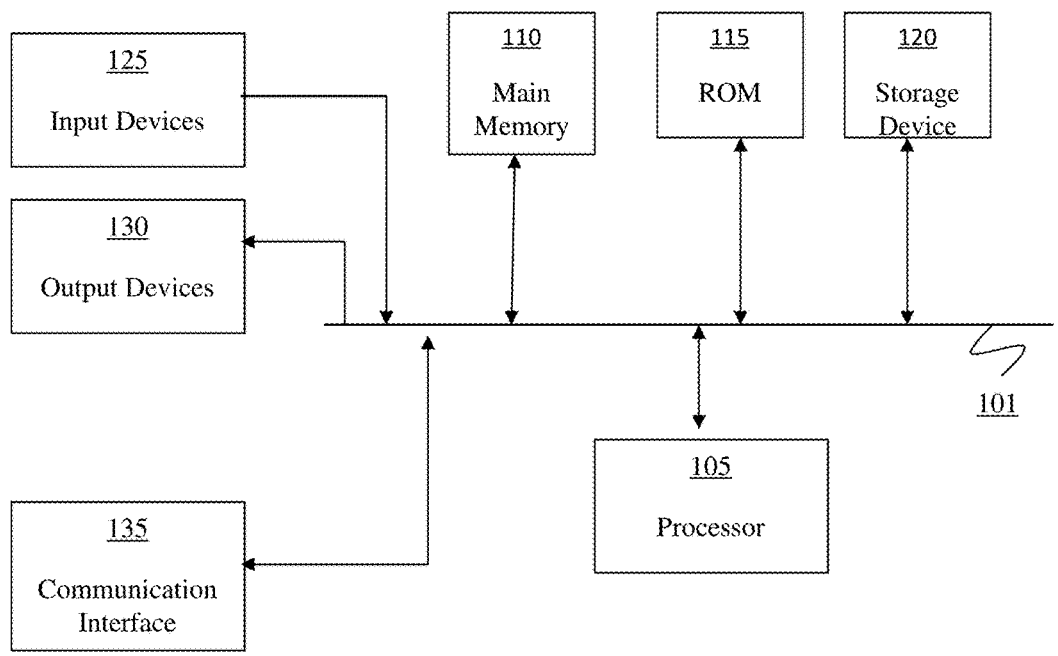
FIG. 1 is an exemplary diagram of a computing device that may be used to implement aspects of certain embodiments of the present invention.

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

Certain figures in this specification may be flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

In the following description, certain embodiments are described in terms of particular data structures, preferred and optional enforcements, preferred control flows, and examples. Other and further application of the described methods, as would be understood after review of this application by those with ordinary skill in the art, are within the scope of the invention.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example and without limitation, a floppy disk, a flexible disk, a hard disk, a magnetic tape, any other magnetic medium, a CD-ROM, a DVD, any other optical medium.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

FIG. 1 is an exemplary diagram of a computing device 100 that may be used to implement aspects of certain embodiments of the present invention. Computing device 100 may include a bus 101, one or more processors 105, a main memory 110, a read-only memory (ROM) 115, a storage device 120, one or more input devices 125, one or more output devices 130, and a communication interface 135. Bus 101 may include one or more conductors that permit communication among the components of computing device 100. Processor 105 may include any type of conventional processor, microprocessor, or processing logic that interprets and executes instructions. Main memory 110 may include a random-access memory (RAM) or another type of dynamic storage device that stores information and instructions for execution by processor 105. ROM 115 may include a conventional ROM device or another type of static storage device that stores static information and instructions for use by processor 105. Storage device 120 may include a magnetic and/or optical recording medium and its corresponding drive. Input device(s) 125 may include one or more conventional mechanisms that permit a user to input information to computing device 100, such as a keyboard, a mouse, a pen, a stylus, handwriting recognition, voice recognition, biometric mechanisms, and the like. Output device(s) 130 may include one or more conventional mechanisms that output information to the user, including a display, a projector, an A/V receiver, a printer, a speaker, and the like. Communication interface 135 may include any transceiver-like mechanism that enables computing device/server 100 to communicate with other devices and/or systems. Computing device 100 may perform operations based on software instructions that may be read into memory 110 from another computer-readable medium, such as data storage device 120, or from another device via communication interface 135. The software instructions contained in memory 110 cause processor 105 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, memory 110 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 110 may optionally include one or more storage devices remotely located from the processor(s) 105. Memory 110, or one or more of the storage devices (e.g., one or more non-volatile storage devices) in memory 110, may include a computer readable storage medium. In certain embodiments, memory 110 or the computer readable storage medium of memory 110 may store one or more of the following programs, modules and data structures: an operating system that includes procedures for handling various basic system services and for performing hardware dependent tasks; a network communication module that is used for connecting computing device 110 to other computers via the one or more communication network interfaces and one or more communication networks, such as the Internet, other wide area networks, local area networks, metropolitan area networks, and so on; a client application that may permit a user to interact with computing device 100.

Figure 2:
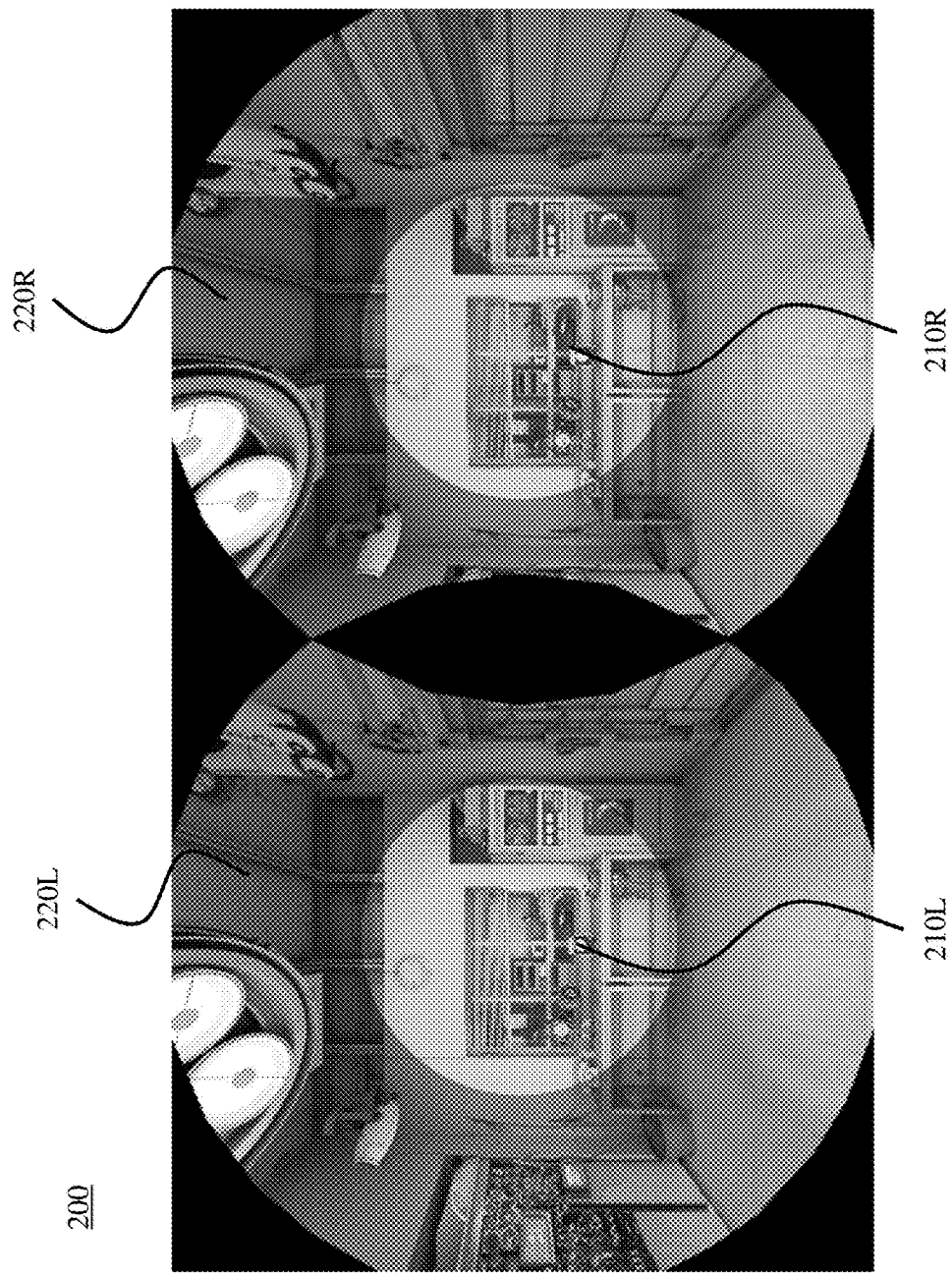
FIG. 2 is an exemplary graphics image, depicting inner and outer rendering regions according to certain embodiments of the present invention.

In certain embodiments, the pixels centered on the optics 210L, and 210R are rendered at a high resolution, and the pixels on the outside 220L, and 220R are rendered at a lower resolution. It should be kept in mind that a projection matrix used in certain embodiments provides more pixels at the periphery 220L, and 220R than it does in the center 210L, and 210R of the view, which is the opposite of what is needed in typical virtual reality ("VR") applications due to the lens correction warp. In the image 200 shown in FIG. 2, using fixed radial density masking, we would render the pixels within the innermost circles 210L, 210R at 1.4× (or even 1.6× for a true 1:1) and then render the pixels within the outer circles 220L, 220R at 1.0×.

The way this is implemented in certain embodiments is to render into four viewports 330L, 330R, 340L, and 340R (also called "subviews") of a render target for the inner 330L, 330R and outer 340L, 340R pixels. All of the pixels that are not needed from each subview are stencil masked 310 or depth masked 320 to avoid wasteful pixel shading. The final render target appears as the image 300 depicted at FIG. 3.

Figure 4:
FIG. 4 is an exemplary graphics image, depicting the output of radial density masking rendering algorithms, according to certain embodiments of the present invention.

Then, a reconstruction pass is performed to generate a clean image 410 at the resolution that it would have normally been rendered (or the resolution matching the highest scalar from any of the subviews), and this only takes about 0.1 ms/eye in certain embodiments, which accounts for a little less than 2% of the frame. One exemplary output of this processing step is shown in image 400 depicted in FIG. 4.

Figure 5A:
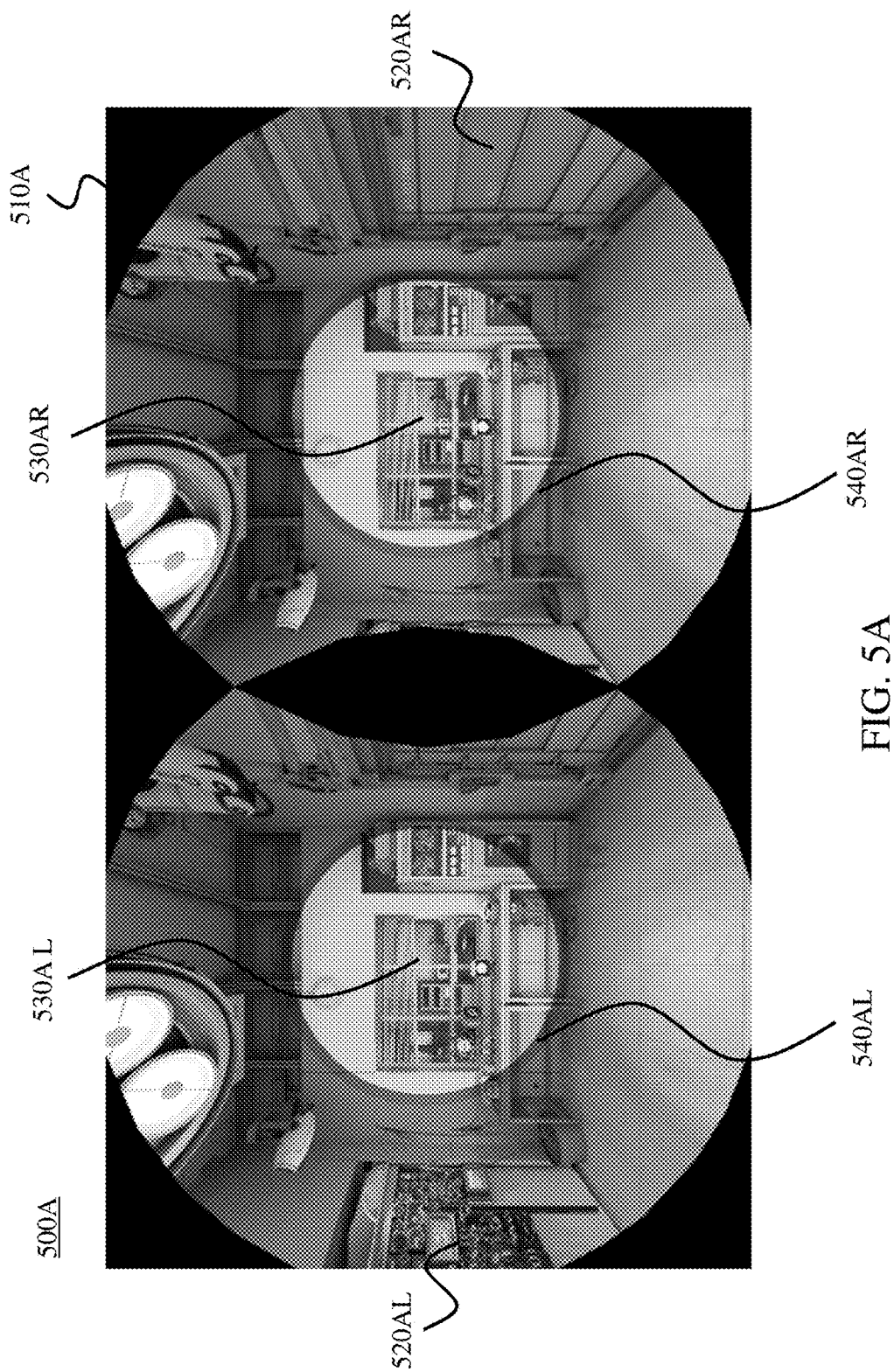
FIG. 5A is an exemplary graphics image, depicting inner and outer rendering regions, as well as an intermediate blended rendering region, according to certain embodiments of the present invention.

For the pixels at the boundary between high resolution values 520AL, 520AR, and low resolution values 530AL, 530AR are fetched from both sub views and blending between them is performed, using techniques that are well-known to skilled artisans. This blended region is depicted in one example at image 500A of FIG. 5A, in which the ring of pixels 540AL, and 540AR between the inner regions 530AL, 530AR and outer regions 520AL, 520AR, represent the blended boundary based on a console variable ("convar") that defines the overlap.

Various optimizations can be made in certain embodiments, depending on the needs of each particular implementation. For example, the instancing may be set only to 4× for objects that straddle the boundary of the inner 530AL, 530AR, and outer 520AL, 520AR subviews. For most objects, a designer should be able to choose either the inner 530AL, 530AR, or outer 520AL, 520AR subviews to avoid the additional transform cost. For example, most of the items on the desk in the images mentioned above should only go to the inner subviews 530AL, 530AR and the really complex machine on the left should only go to the outer subviews 520AL, and 520AR.

In certain embodiments a boundary region 540AL, and 540AR may be implemented to blur the reconstructed checkered pattern with the non-checkered area to ease the transition. In one implementation, the checkered pattern is set to fit outside the boundary region, such that there are no checkered cutouts in the thin boundary rings 540AL, and 540AR. In such an exemplary implementation, when the image is reconstructed, for the pixels on the thin boundary ring 540AL, and 540AR even though there are no holes cut out, a reconstructed checkered value is calculated as if there were holes, and then interpolated to the actual rendered pixel. The interpolation uses a weight from 0.0-1.0 from the inner edge 530AL, and 530AR to outer edge 520AL, and 520AR of that ring so the outer pixels use the full checkered reconstructed value and the inner pixels use the full high-resolution rendered pixel. The specifics depend on the particular requirements of each implementation, and can be readily determined by skilled artisans.

Figure 5B:
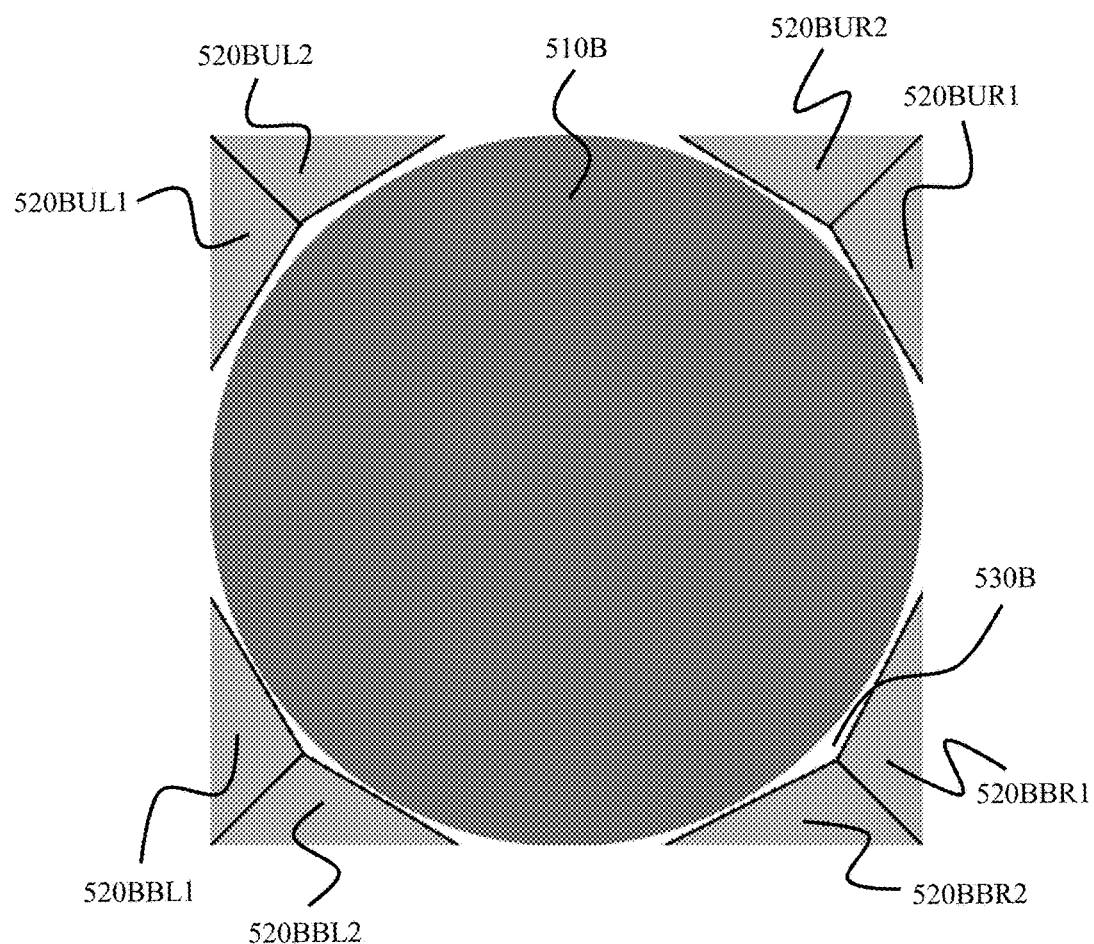
FIGS. 5B and 5C depict a greyscale version of an exemplary stencil/depth masks that may be implemented in accordance with certain embodiments of the present invention.
Figure 5C:
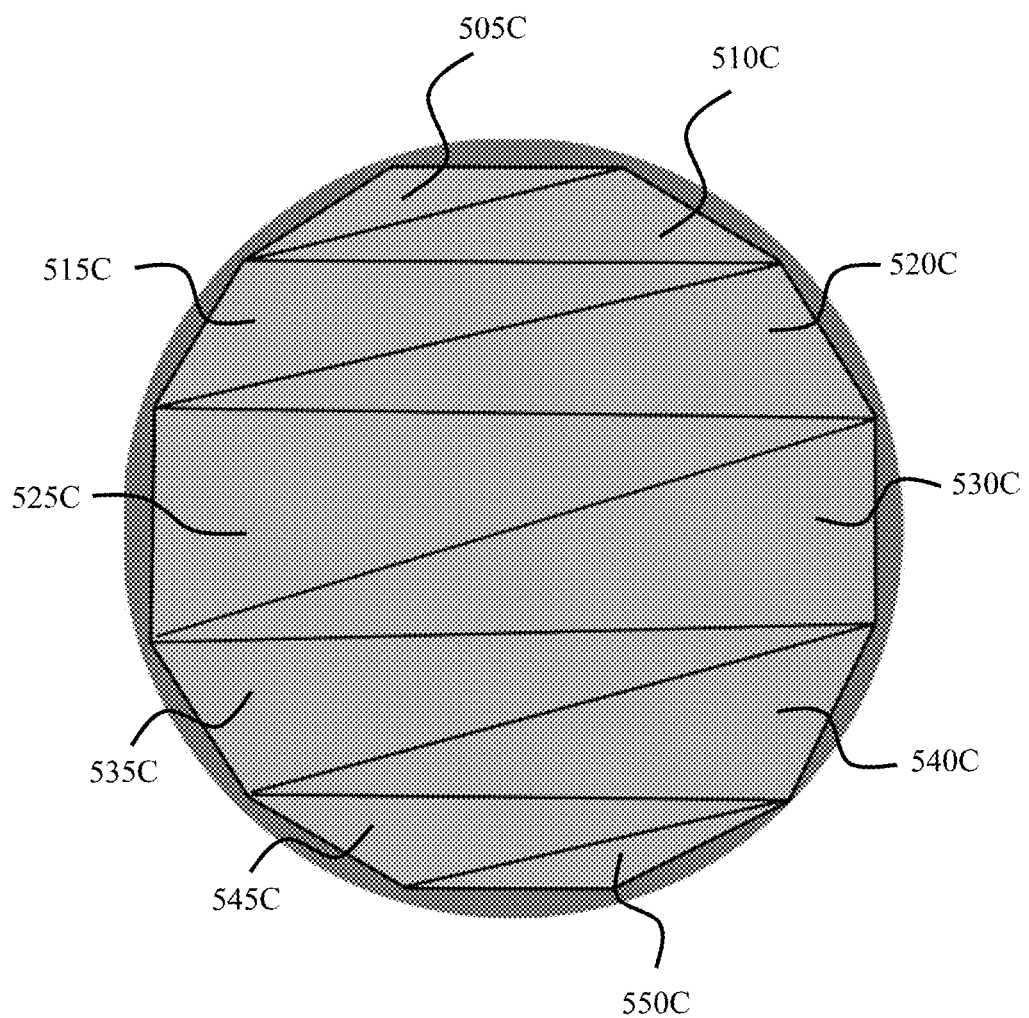

FIGS. 5B and 5C depict exemplary stencil/depth masks 500B, and 500C that may be implemented in accordance with certain embodiments of the present invention. In the mask 500B depicted in FIG. 5B, the inner circle 510B has the four corners stenciled out using eight outer triangles 520BUL1, 520BUL2, 520BUR1, 520BUR2, 520BBL1, 520BBL2, 520BBR1, and 520BBR2. The outer ring 530B is rendered with the inside circle 510B stenciled out using those triangles (520BUL1, 520BUL2, 520BUR1, 520BUR2, 520BBL1, 520BBL2, 520BBR1, and 520BBR2), which form a rough circular shape as shown in the FIG. 500B. It should be noted that both are offset from the circle by half the boundary overlap, which is why neither touches the edge of the inner circle. It should also be noted that the boundary of the inner circle 510B is located at the center of the boundary or on the inner or outer edge of the boundary. As depicted in the FIG. 500B, there are three distinct non-overlapping regions: inner 510B, boundary 530B, and outer 520BUL1, 520BUL2, 520BUR1, 520BUR2, 520BBL1, 520BBL2, 520BBR1, and 520BBR2.

In certain embodiments, the relatively large approximate triangles 505C, 510C, 515C, 520C, 525C, 530C, 535C, 540C, 545C and 550C in image 500C depicted in FIG. 5C are used instead of cutting out the exact shape in a pixel shader because graphics processing units ("GPUs") can typically render depth and stencil-only at much higher rates than when a pixel shader is implemented. In certain embodiments, as depicted in FIGS. 5B and 5C, the reduced number of edges also reduces the cost of rendering, since GPUs generally rasterize 2×2 quads of pixels at a time, so as the number of edges decreases, performance loss also decreases (note, for example, as one optimization, that six of the edges of the triangles depicted in the image 500C depicted in FIG. 5C are horizontal lines).

Figure 3:
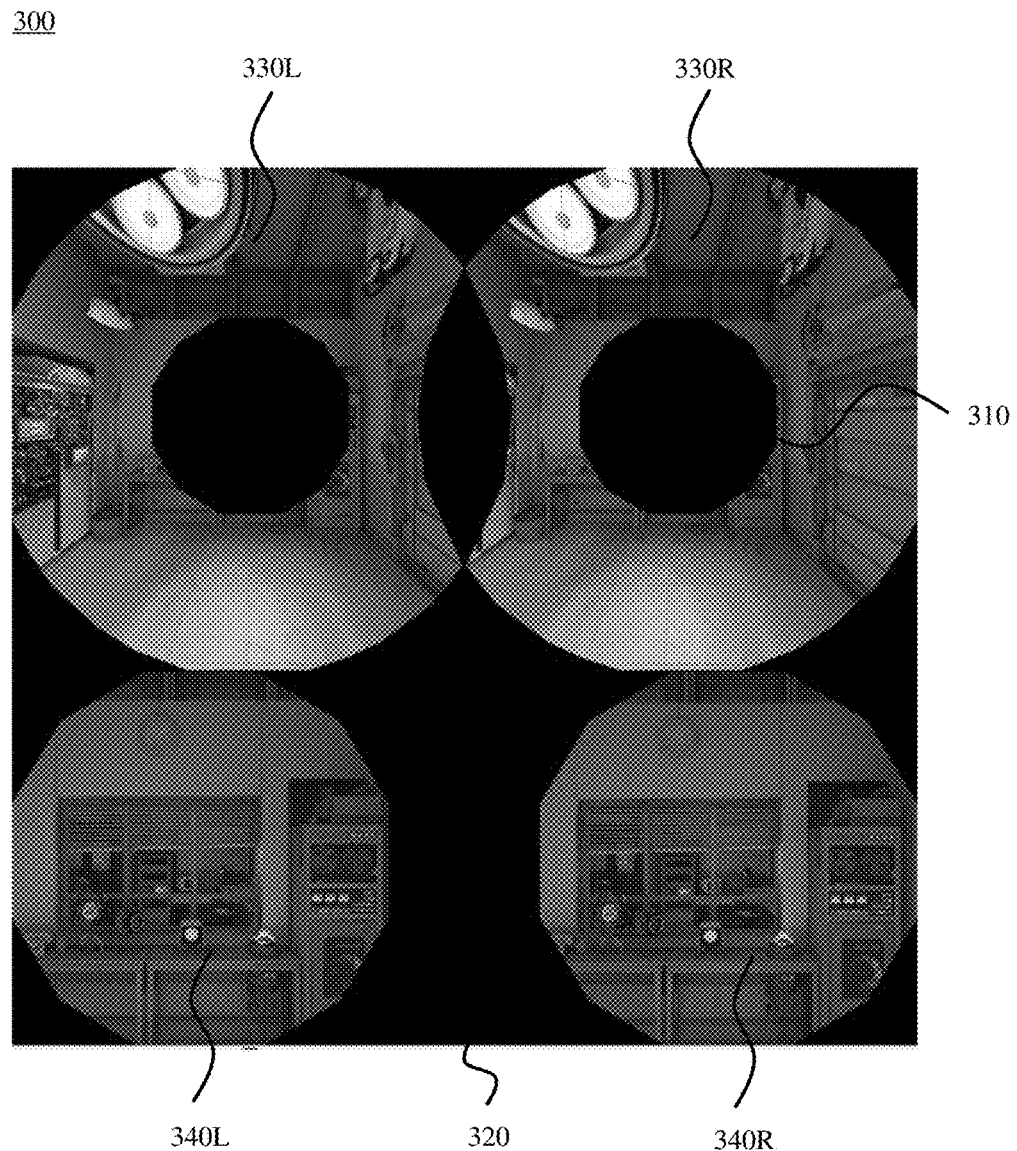
FIG. 3 is an exemplary graphics image, depicting four viewports of a render target for inner and outer pixel regions, according to certain embodiments of the present invention.
Figure 5D:
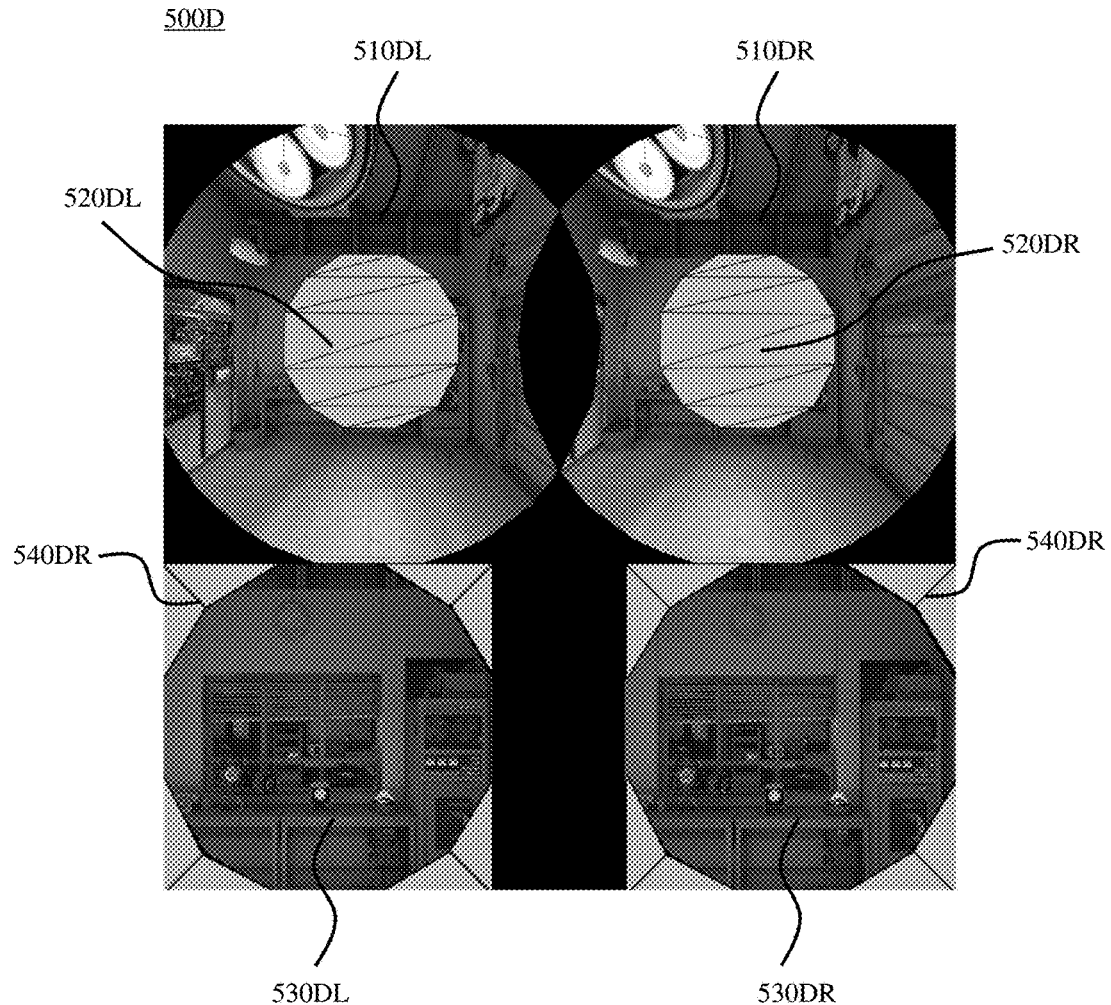
FIG. 5D depicts an exemplary stencil/depth masks of FIGS. 5B and 5C, overlaid onto the exemplary graphics image of FIG. 3.

The image 500D in FIG. 5D depicts the exemplary stencil/depth masks of FIGS. 5B and 5C, overlaid onto the exemplary graphics image 300 of FIG. 3.

In other embodiments, instead of rendering two viewports for each eye, 2×2 quads of pixels are stenciled out or depth masked in a checkered pattern for all pixels that would have landed in the outer ring 510DL, and 510DR but not in the blended region between the high resolution areas 520DL, 520DR and low resolution areas 510DL, 510DR. This means all vertices do not have to be transformed twice per eye, but there is an additional cost in the form of having to fill the stencil or depth buffer with the checkered pattern and of reconstructing a solid image using a hole-filling algorithm as described herein (in exemplary embodiments).

Figure 6:
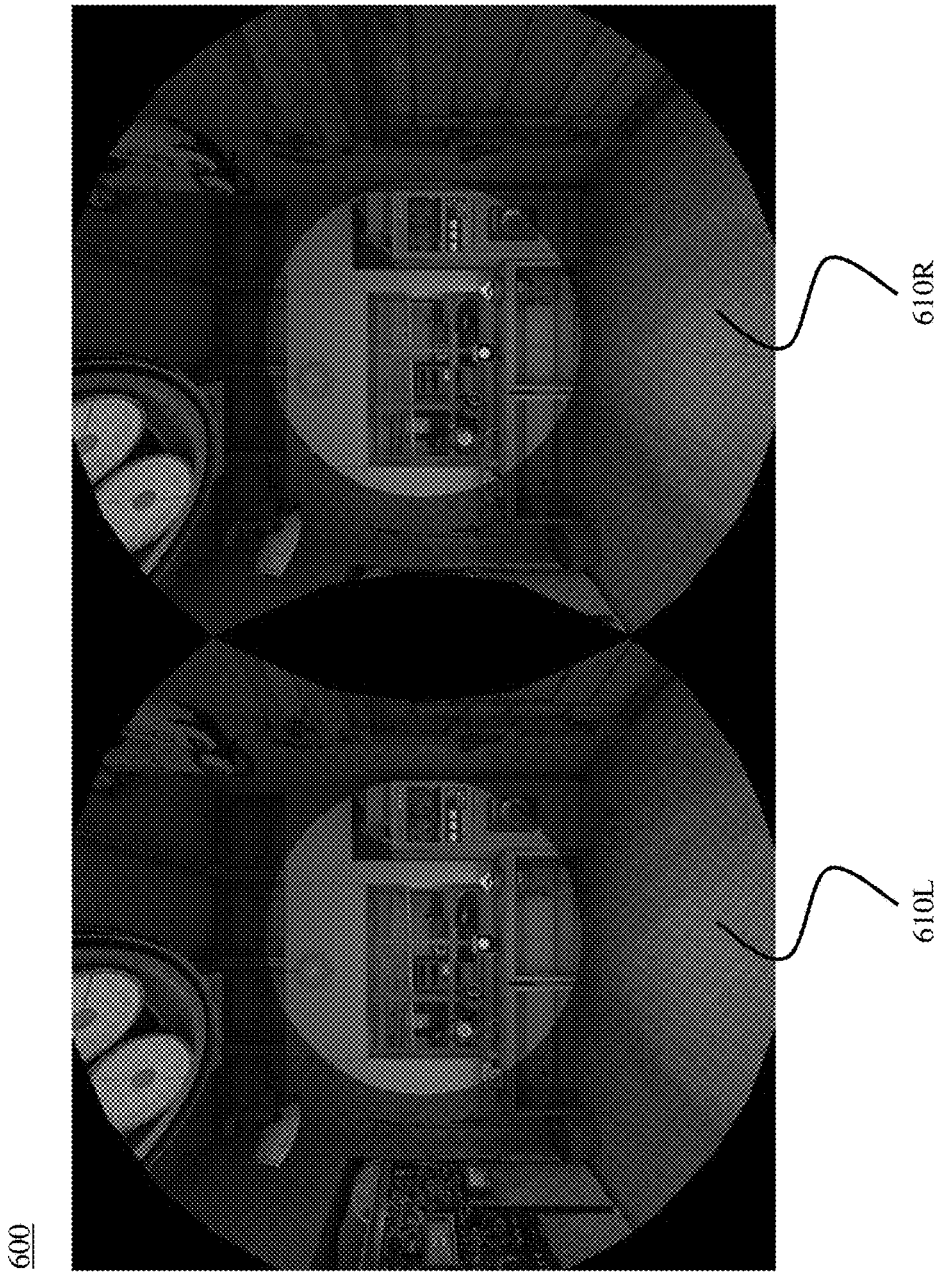
FIG. 6 is a greyscale version of an exemplary graphics image, depicting the pre-reconstruction output of a "checkered pattern" radial density masking rendering algorithm, according to certain embodiments of the present invention.

When examining a raw stereo render, it may be observed that the pixels in the outer rings 610L, 610R that would have been rendered at half resolution in the fixed radial density masking algorithm described earlier are now rendered with a checkered pattern stenciled out or depth masked, so only half of the pixels in the outer rings 610L, 610R are being rendered. This is depicted in image 600 of FIG. 6.

After reconstruction, a clean image 700 is obtained. This is depicted in FIG. 7.

Figure 7:
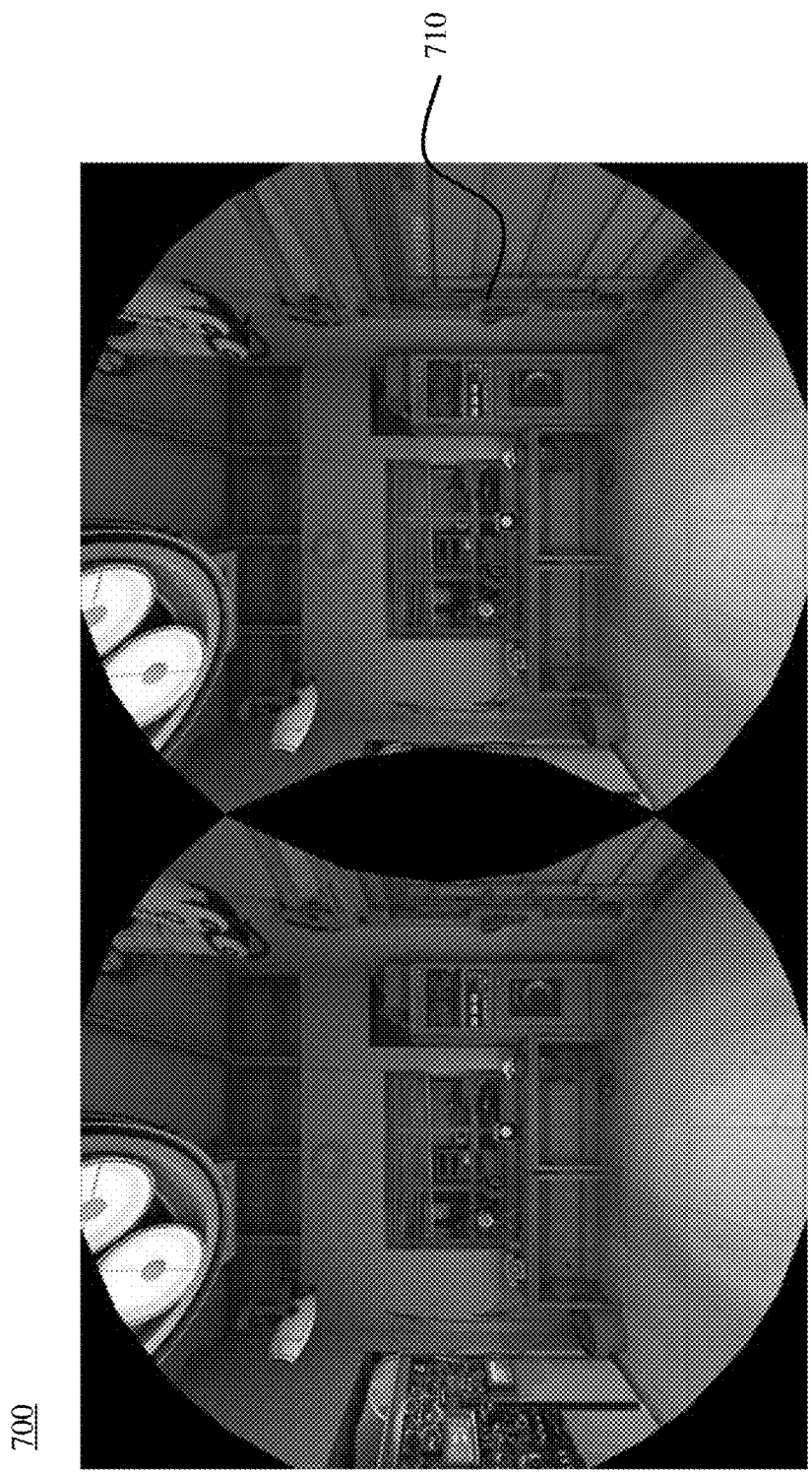
FIG. 7 is an exemplary graphics image, depicting the post-reconstruction output of a "checkered pattern" radial density masking rendering algorithm, according to certain embodiments of the present invention.
Figure 8:
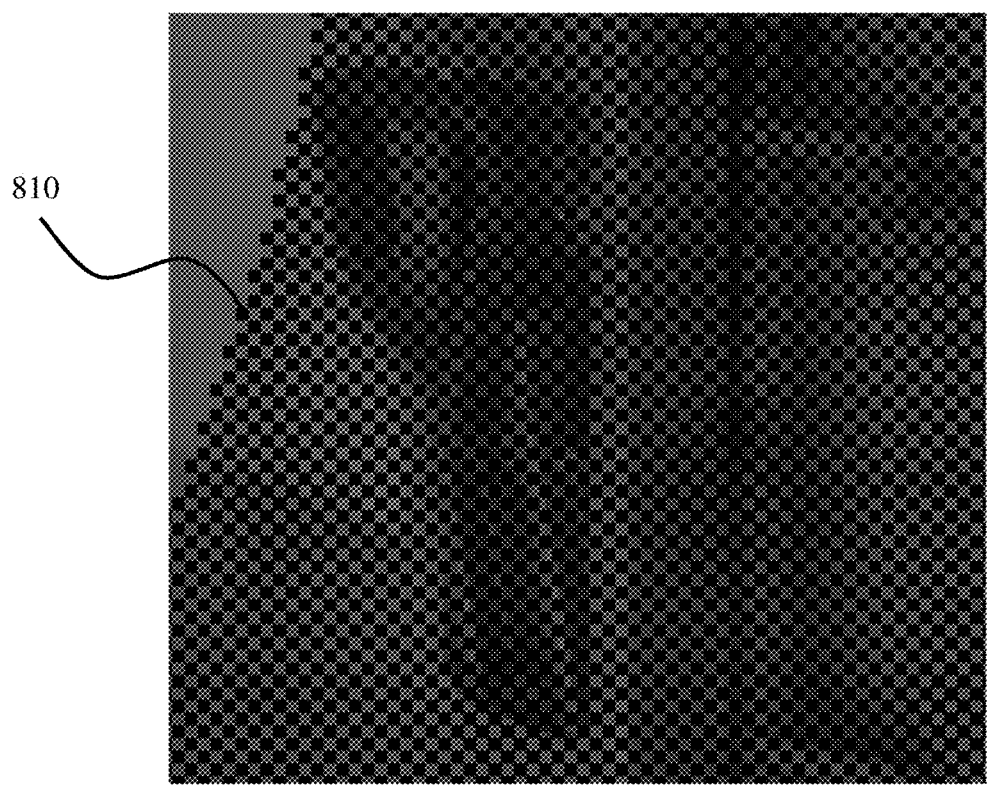
FIG. 8 is an exemplary graphics image, depicting a zoomed-in area of the pre-reconstruction output of a "checkered pattern" radial density masking rendering algorithm shown in FIG. 7, according to certain embodiments of the present invention.

If one zooms into the red door handle 710 on the right of the image shown in FIG. 7, the raw stenciled render appears in image 800 as depicted in FIG. 8, with 2×2 quads 810 stenciled out. In certain embodiments, 2×2 pixel quads 810 are used because typical graphic processing units ("GPUs") operate on 2×2 quads of pixels in parallel, so masking out a higher frequency checkered pattern would not be a performance win in such embodiments. One constraint of algorithms according to certain embodiments of the present invention is that it exhibits a fixed-quality downgrade for the outer ring, but the width of that ring and the smoothly blended overlap are controllable.

Figure 9:
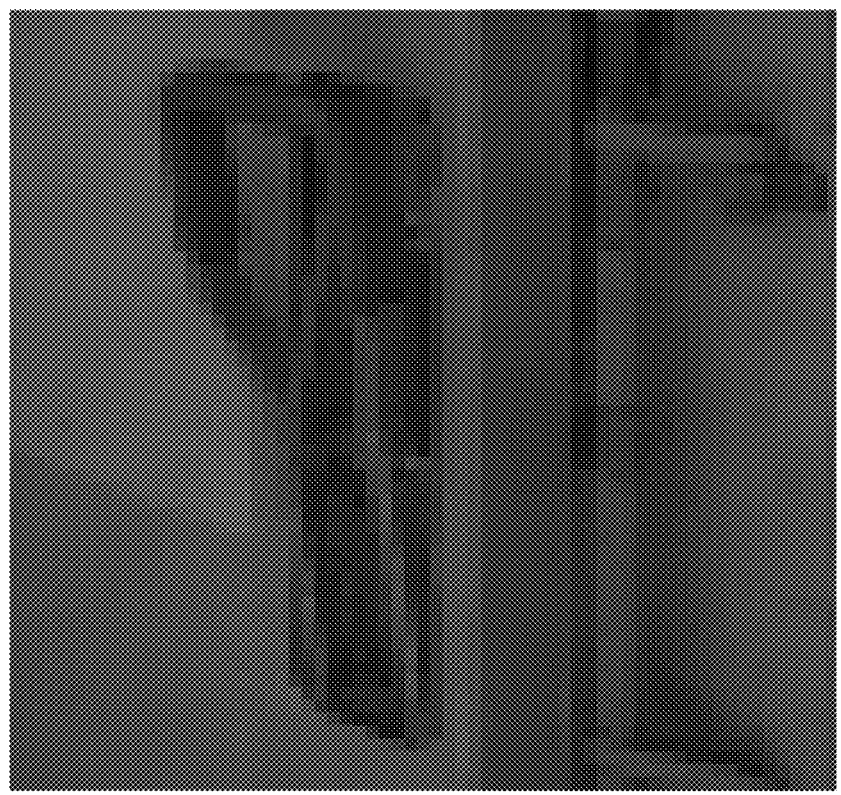
FIG. 9 is an exemplary graphics image, depicting the output of hole-filling and cross-cell blending algorithms on the image depicted in FIG. 8, according to certain embodiments of the present invention.

A two-stage algorithm for reconstruction that is optimized into a single shader pass is then executed. The first stage performs hole-filling and cross-cell blending to generate an image 900 as shown in FIG. 9.

Figure 10:
FIG. 10 is an exemplary graphics image, depicting the output of a radial density masking algorithm (including a 3×3 Gaussian blur) on a portion of the image depicted in FIG. 7, according to certain embodiments of the present invention.

The second stage of the algorithm applies a simple 3×3 Gaussian blur. The exemplary result is shown in image 1000 of FIG. 10.

The following description provides more detail on the three stages of the reconstruction algorithm according to certain embodiments:

1. Hole filling
2. Cross-cell blending
3. 3×3 Gaussian blur

1. Hole Filling

Figure 11:
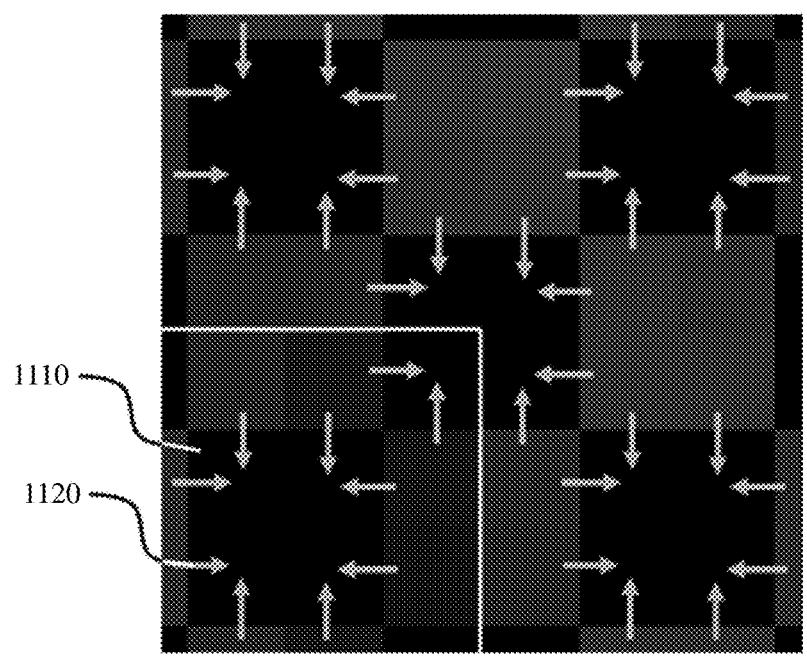
FIG. 11 is an exemplary diagram depicting closest-neighbor averaging to generate color information according to certain embodiments of the present invention.

For each 2×2 block of black pixels 1110, their closest neighbors 1120 are averaged to generate their color. This is shown in the image 1100 of FIG. 11.

2. Cross-Cell Blending

Figure 12:
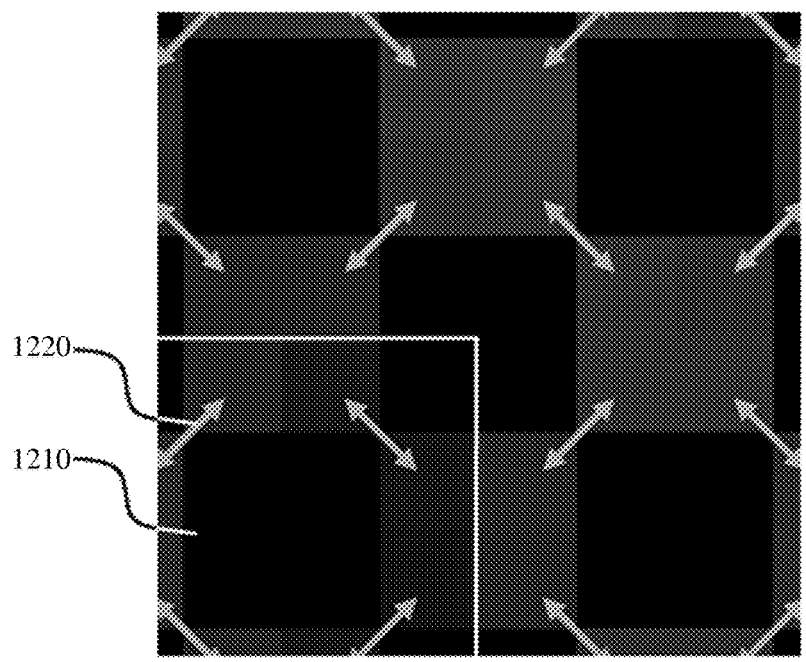
FIG. 12 is an exemplary diagram depicting diagonal neighbor cell averaging according to certain embodiments of the present invention.

For the pixels 1210 that were actually rendered, an average 1220 is taken across diagonal neighbor cells. This is shown in image 1200 of FIG. 12.

Figure 13:
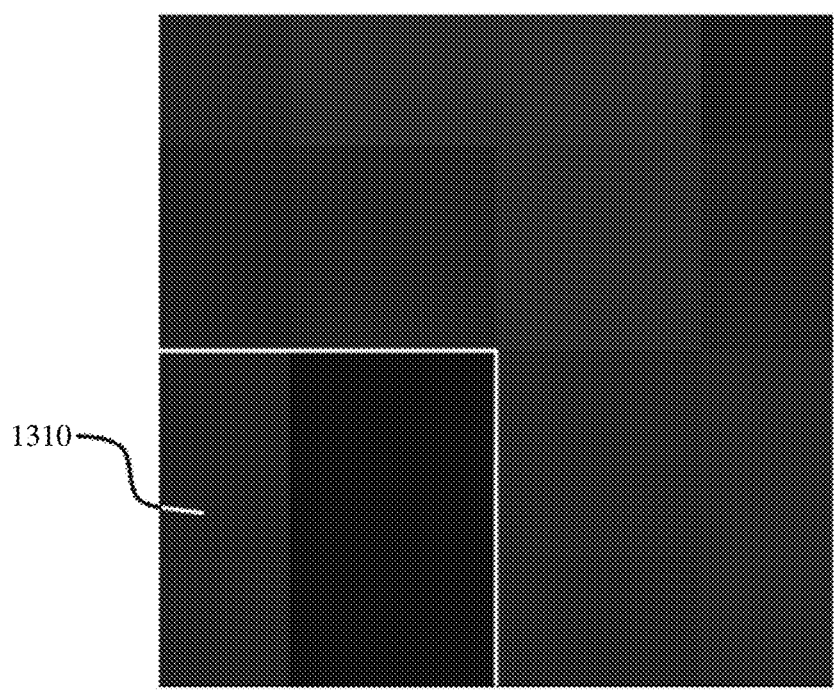
FIG. 13 is an exemplary diagram depicting the result of the two blending operations that were depicted in FIGS. 11 and 12, according to certain embodiments of the present invention.

The result 1310 of both of these blending operations is shown in the image 1300 of FIG. 13 in an exemplary embodiment.

3. 3×3 Gaussian Blur

Figure 14:
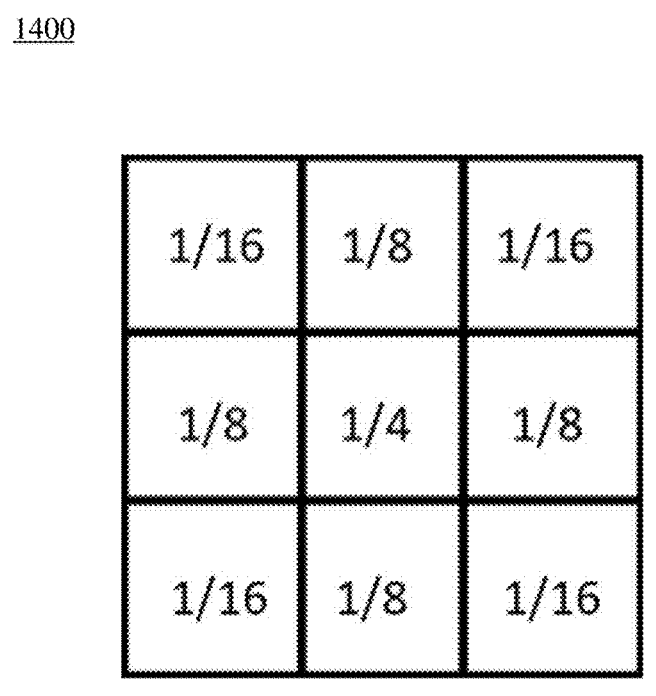
Figure 15:
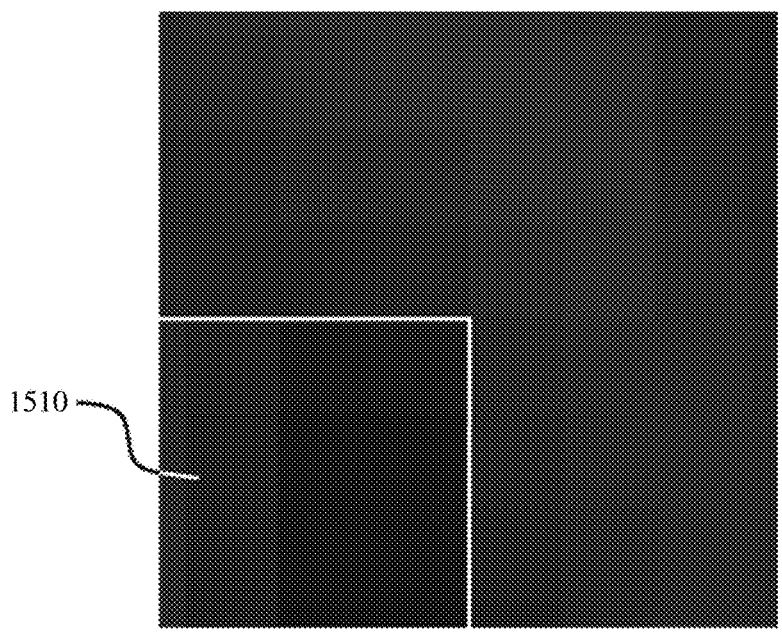
FIG. 15 is an exemplary diagram depicting the final result of a checkered radial density masking rendering algorithm on a portion of a graphics image according to certain embodiments of the present invention.

The last stage is to apply a Gaussian blur. An exemplary kernel 1400 for this purpose is shown in FIG. 14. The final result 1510 appears as in the image 1500 of FIG. 15 in an exemplary embodiment.

Optimized Single Pass Algorithm:

In certain embodiments, all three of the processing stages of the algorithm according to aspects of the present invention are combined into a single optimized 4- or 5- texel-fetch shader pass.

Figure 16:
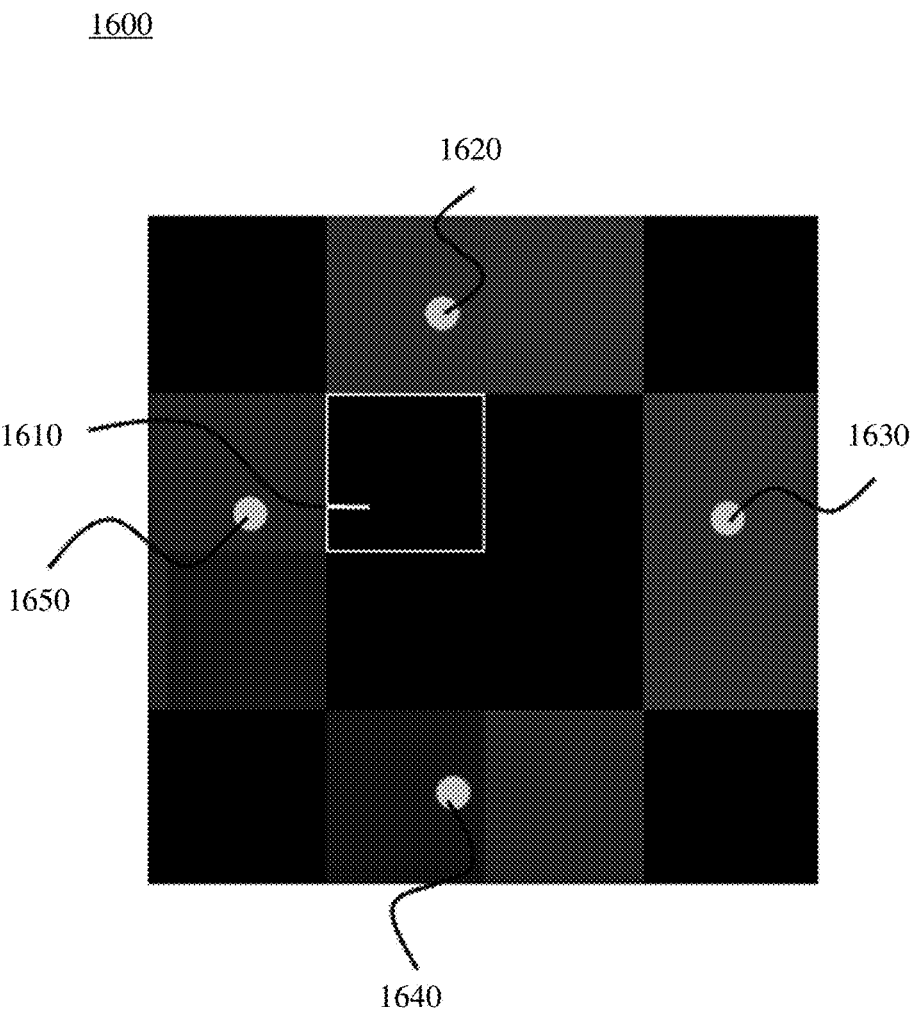
FIG. 16 is an exemplary diagram depicting aspects of a weighted averaging algorithm according to certain embodiments of the present invention.

For a black texel 1610 that was stenciled out, the 4 bilinear two-dimensional uv's 1620, 1630, 1640, and 1650 are fetched from these locations to create a weighted average of those eight texels. This is shown in image 1600 of FIG. 16. Each of those four samples are weighted and summed for the white-outlined pixel 1610 with weights of 0.375, 0.375, 0.125, 0.125 from nearest to farthest samples.

Figure 17:
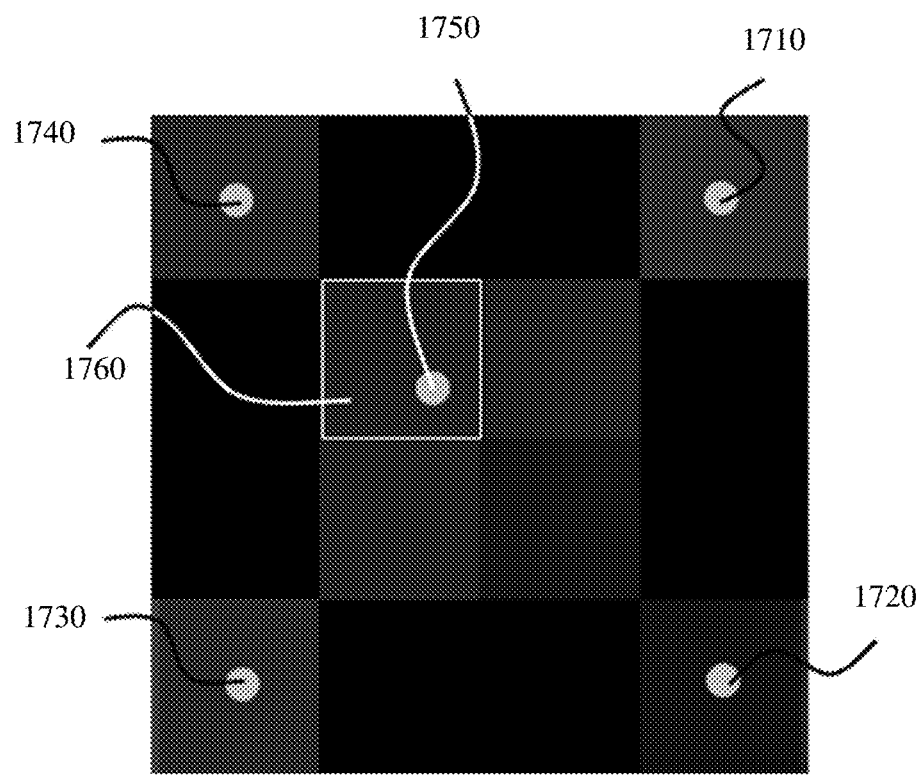
FIG. 17 is an exemplary diagram depicting aspects of another weighted averaging algorithm according to certain embodiments of the present invention.

For pixels that are actually rendered, as shown in image 1700 of FIG. 17, the five bilinear uv's 1710,1720,1730, 1740, and 1750 are fetched from these locations to create a weighted average of those eight texels. This is shown in FIG. 17.

Each of those five samples 1710,1720,1730,1740, and 1750 are weighted and summed for the white-outlined pixel 1760 with weights of 0.5, 0.28125, 0.09375, 0.09375, 0.03125 from nearest to farthest samples.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub-combination of the elements from the different species and/or embodiments disclosed herein.

What is claimed is:

1. A method comprising:
   receiving a digital image;
   identifying a first portion and a second portion of the digital image;
   applying a checkered mask to the first portion of the digital image to mask out alternating pixel blocks;
   identifying masked pixels and unmasked pixels within the first portion of the digital image;
   generating an updated first portion of the digital image, wherein the generating the updated first portion comprises:
      a hole-filling stage that determines color values for individual masked pixels using color values of unmasked pixels adjacent to the individual masked pixels, and
      a cross-blending stage that determines color values for the individual unmasked pixels; and
   generating updated digital image data based at least in part on the updated first portion and the second portion, wherein the generating the updated digital image comprises a blurring stage that blends a boundary region between the updated first portion and the second portion.

2. The method of claim 1, wherein one or more of the hole-filling stage, the cross-blending stage, or the blurring stage are combined.

3. The method of claim 1, wherein the hole-filling stage, the cross-blending stage, and the blurring stage are combined into an optimized shader pass.

4. The method of claim 1, wherein the hole-filling stage, the cross-blending stage, and the blurring stage are combined into an optimized 4-texel shader pass.

5. The method of claim 1, wherein the hole-filling stage, the cross-blending stage, and the blurring stage are combined into an optimized 5 -texel shader pass.

6. A computer-implemented method, comprising:
   receiving a digital image;
   identifying a first portion of the digital image and a second portion of the digital image;

applying a mask to the first portion of the digital image, wherein the mask comprises a checkered-pattern that masks out alternating pixel blocks within the first portion of the digital image;

generating an updated first portion of the digital image based at least in part on:
- a hole-filling stage that determines depth values for masked pixels within the first portion using depth values of unmasked pixels adjacent to the masked pixels, and
- a cross-blending stage that determines depth values for unmasked pixels within the first portion; and generating updated digital image data using the updated first portion and the second portion, the generating comprising a blurring stage that blends a boundary between the updated first portion and the second portion.

7. The method of claim 6, wherein one or more of the hole-filling stage, the cross-blending stage, or the blurring stage are combined.

8. The method of claim 6, wherein the hole-filling stage, the cross-blending stage, and the blurring stage are combined into an optimized shader pass.

9. The method of claim 6, wherein the hole-filling stage, the cross-blending stage, and the blurring stage are combined into an optimized 4-texel shader pass.

10. The method of claim 6, wherein the hole-filling stage, the cross-blending stage, and the blurring stage are combined into an optimized 5-texel shader pass.

11. A system comprising:
at least one processor; and
one or more non-transitory computer-readable media storing computer-executable instructions that, when executed by the at least one processor, cause the at least one processor to perform acts comprising:
receiving image data corresponding to an image;
identifying a first portion of the image and a second portion of the image;
applying a mask to the first portion of the image, wherein the mask comprises a checkered-pattern mask that masks out alternating pixel blocks;
identifying, within the first portion of the image:
a masked pixel;
a first unmasked pixel; and
a second unmasked pixel, wherein the first unmasked pixel and the second unmasked pixel are adjacent to the masked pixel;
determining an updated masked pixel using a color value assigned to the first unmasked pixel and a color value assigned to the second unmasked pixel;
generating an updated first portion of the image based at least in part on cross-blending the color value assigned to the first unmasked pixel and the color value assigned the second unmasked pixel;
generating updated image data based at least in part on the updated first portion of the image and the second portion of the image; and
applying a blur to a region between the updated first portion of the image and the second portion of the image.

12. The system of claim 11, wherein the one or more non-transitory computer-readable media store computer-executable instructions that, when executed by the at least one processor, cause the at least one processor to further perform an act comprising determining an average color value using the color value assigned to the first unmasked pixel and the color value assigned to the second unmasked pixel, and
wherein the generating the updated masked pixel is based at least in part on the average color value.

13. The system of claim 11, wherein the one or more non-transitory computer-readable media store computer-executable instructions that, when executed by the at least one processor, cause the at least one processor to further perform acts comprising:
determining an average color value using the color value assigned to the first unmasked pixel and the color value assigned to the second unmasked pixel;
generating an updated first unmasked pixel; and
generating an updated second unmasked pixel.

14. The system of claim 13, wherein the generating the updated image data is further based at least in part on:
the updated first unmasked pixel; and
the updated second unmasked pixel.

15. The system of claim 13, wherein a color value assigned to the updated masked pixel, a color value assigned to the updated first unmasked pixel, and a color value assigned to the updated second unmasked pixel are the same.

16. The system of claim 11, wherein the first unmasked pixel and the second unmasked pixel border the masked pixel.

17. The system of claim 11, wherein the first portion of the image is rendered at least at half the resolution as the second portion of the image.

18. The system of claim 1, further comprising a display, and wherein the one or more non-transitory computer-readable media store computer-executable instructions that, when executed by the at least one processor, cause the at least one processor to further perform an act comprising displaying the updated image data on the display.

* * * * *